(No Model.) 4 Sheets—Sheet 1.

D. C. STOVER.
WINDMILL.

No. 386,503. Patented July 24, 1888.

WITNESSES:

INVENTOR,
Daniel C. Stover,
BY
Wiles & Greene,
ATTORNEYS.

(No Model.)  4 Sheets—Sheet 2.

D. C. STOVER.
WINDMILL.

No. 386,503. Patented July 24, 1888.

WITNESSES:

INVENTOR,

BY

ATTORNEYS.

(No Model.) 4 Sheets—Sheet 3.

D. C. STOVER.
WINDMILL.

No. 386,503. Patented July 24, 1888.

WITNESSES:

INVENTOR,
Daniel C. Stover
by Wiles & Greene
ATTORNEYS.

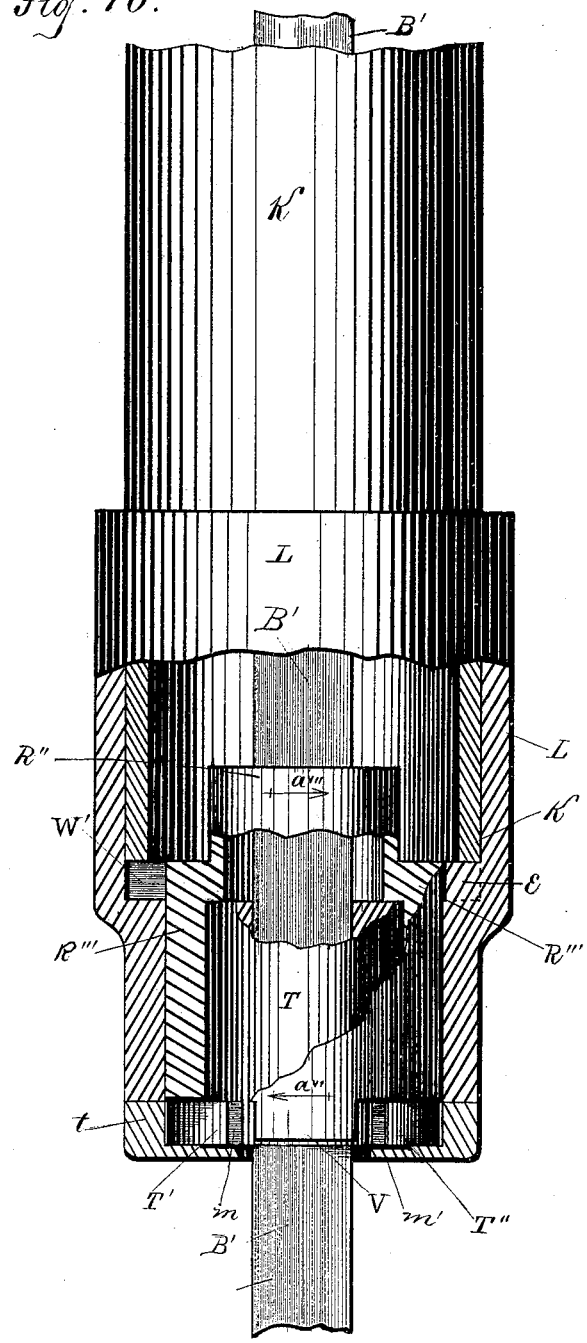

UNITED STATES PATENT OFFICE.

DANIEL C. STOVER, OF FREEPORT, ILLINOIS.

WINDMILL.

SPECIFICATION forming part of Letters Patent No. 386,503, dated July 24, 1888.

Application filed June 15, 1885. Serial No. 168,679. (No model.)

*To all whom it may concern:*

Be it known that I, DANIEL C. STOVER, a resident of Freeport, in the county of Stephenson and State of Illinois, have invented certain new and useful Improvements in Windmills; and I do hereby declare the following to be a full, clear, and exact description of the invention, such as will enable others skilled in the art to which it pertains to make and use the same.

My invention relates to improvements in windmills, and is fully described, explained, and claimed in the following specification and shown in the accompanying drawings, in which—

Figure 1:
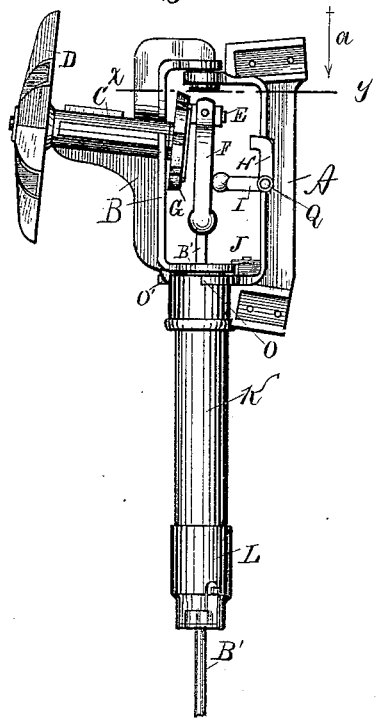
Figure 2:
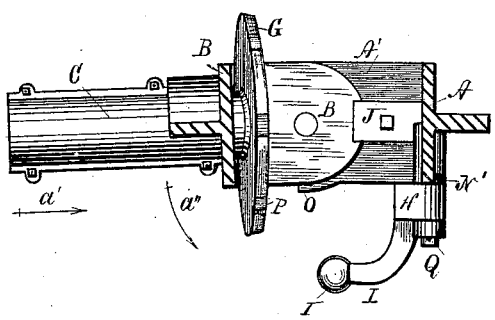
Figure 4:
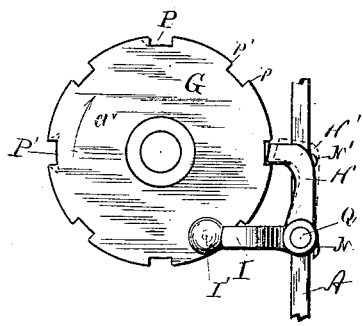
Figure 3:
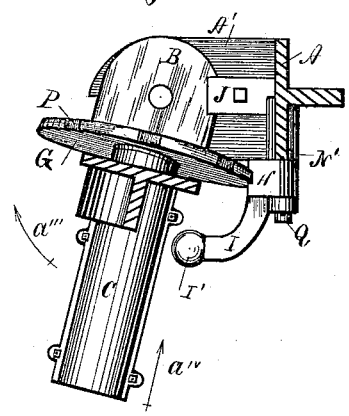
Figure 5:
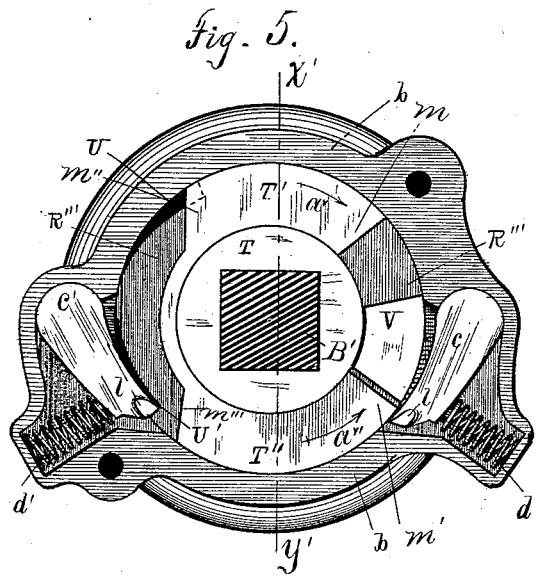
Figure 7:
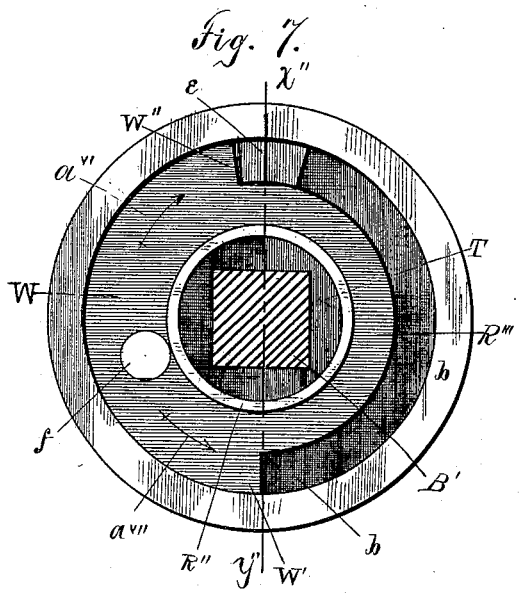
Figure 6:
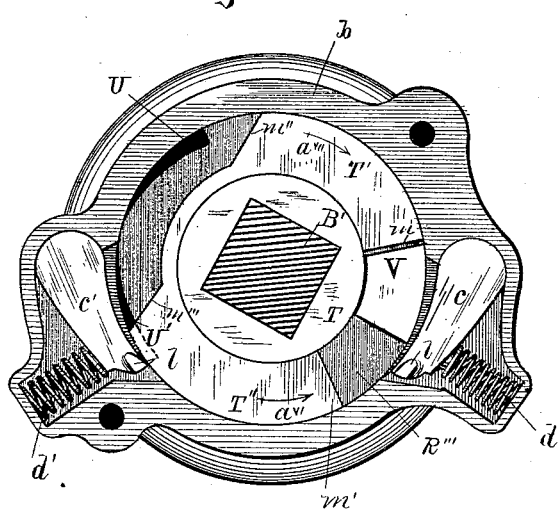
Figure 8:
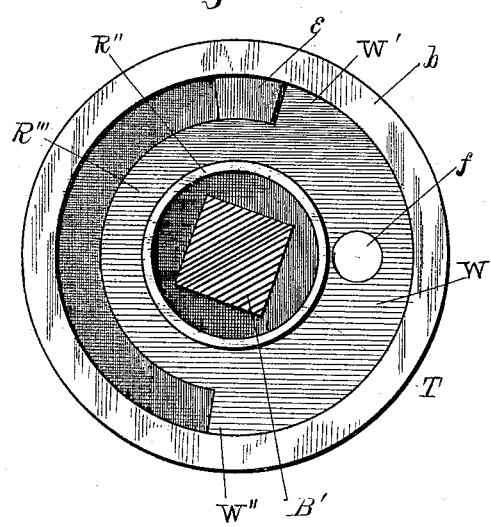
Figure 9:
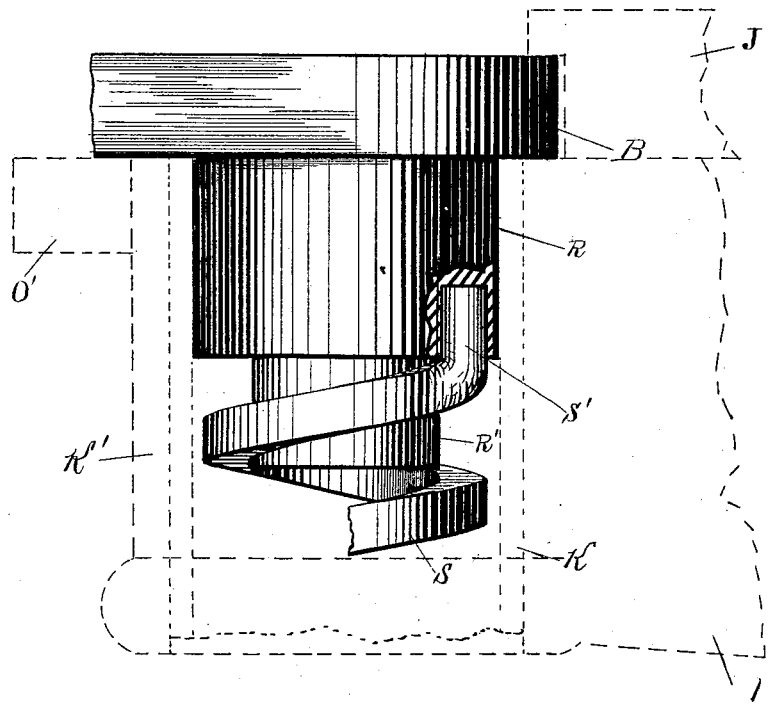
Figure 9:
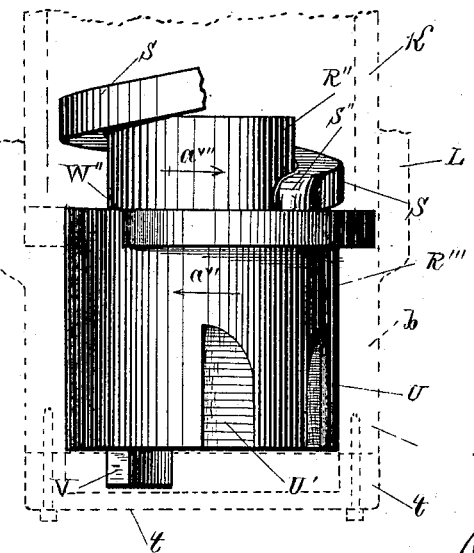

Figure 1 is a side elevation of the working portion of the mill, the wheel being "in the wind." Fig. 2 is a top plan of same, except pump-rod and spider of wind-wheel, the top of the wind-wheel casting and vane-casting being cut away by a horizontal plane passing through the line $x\,y$, Fig. 1; Fig. 3, a top plan of same parts shown in Fig. 2, but in the position reached when the wheel is "out of the wind," the crank-plate G being locked by the dog H; Fig. 4, a side elevation showing the relation of the crank-plate G and dog H; Figs. 5 and 6, bottom views of the device by means of which the wind-wheel casting and vane-casting are connected and disconnected; Figs. 7 and 8, top views of said device; Fig. 9, a side elevation of the spring by means of which the wheel is thrown into or out of the wind and its connection and attachment at top and bottom; and Fig. 10, a side view, partly in section and partly in elevation, of the device by means of which the spring is operated through the pump-rod, the plane of section passing through the line $x'\,y'$, Fig. 5, and the line $x''\,y''$, Fig. 7.

In these views, A is the vane casting of the mill, formed with recesses and bolt-holes at top and bottom, respectively, for the reception of two vane-ribs, and formed integrally with or rigidly attached to a downwardly-extending cylindrical tube, K, adapted to be journaled in a suitable bearing in a tower of any desired construction.

B is the wind-wheel-supporting casting, pivoted at the top in the upper arm of the vane-casting, and provided at the bottom with a downwardly-projecting hollow boss, R, Fig. 9, which rests in the top of the tube K, in which it turns freely.

On the wind-wheel casting B is formed a suitable box or bearing, C, slightly inclined from a horizontal plane, and in this box rests and turns freely the wind-wheel shaft, provided at its outer end with a rigidly-mounted spider, D, adapted to receive the arms of a wind-wheel, and at its inner end with a crank-plate, G. In the crank-plate is set a wrist-pin, E, which is connected by a short pitman, F, with a square pump-rod, B', passing down through the tube K to the foot of the tower.

On the vane-casting A are two stops, O O', limiting the rotation of the wind-wheel casting with reference to the vane-casting. These stops are so placed as to permit rotation from the position shown in Fig. 2 to that shown in Fig. 3. The position shown in Fig. 2 is that in which the wheel is in the wind, the wind-wheel shaft being very nearly in line with the vane. In this position the wind blowing in the direction indicated by the arrow $a'$, Fig. 2, tends to rotate the wind-wheel casting in the direction indicated by the arrow $a''$ in said Fig. 2. When the wind-wheel casting reaches the position shown in Fig. 3, or is fully out of the wind, it strikes the stop O, and its further rotation is thus prevented. With the exception of the crank-plate G, whose peculiarity of form I am about to describe, the construction of the parts thus far enumerated is substantially the same as that of the corresponding parts in my pending application, Serial No. 132,421, and for that reason I have not thought it necessary to describe them in detail.

In the periphery of the crank-plate G are formed a series of notches, P, placed preferably, but not necessarily, at regular intervals, and having their sides approximately radial, and on a horizontal pin or boss, Q, formed on the vane-casting A, is pivoted a square-faced gravity pawl or dog, H, so placed as to impinge upon the periphery of the crank-plate when the wheel swings out of the wind and into the position shown in Fig. 3. The face of the dog is tangent, or nearly so, to the circumference of the crank-plate, the lower edge of the face being the line of contact of the two surfaces, and the upper edge of the face being thus separated from the periphery of the crank-plate by a space varying with the length and inclination of the face of the dog and with the radius of the crank-plate. Each of the notches P has a peripheral extent slightly greater than the length of the face of the dog, the difference between the notch and the dog being regulated to meet the desired conditions under which the device is to operate. The crank-plate turns normally in the direction indicated by the arrow $a^v$, Fig. 4, and when the crank-plate and the dog H are in contact the face $p$ of each of the notches P reaches the lower edge of the face of the dog before the face $p'$ of the corresponding notch reaches the upper edge of the dog. As soon as the face $p$ of the notch reaches the lower edge of the dog, the dog, actuated by the weighted lever I I', drops inward toward the center of the crank-plate and the lower edge of the dog thus enters the notch. Whether the upper edge of the dog shall also enter the notch depends upon the relative sizes of the notch and dog, the relation of the speed of rotation of the crank-plate to the speed of motion of the dog, and the space between the upper edge of the dog and the periphery of the plate. If the upper edge of the dog reaches the periphery of the crank-plate before the face $p'$ of the notch reaches the upper edge of the dog, then the dog will fully enter the notch, and the crank-plate will be securely locked against rotation in either direction. If, on the other hand, the speed of rotation of the crank-plate be such as to carry the face $p'$ of the notch past the upper edge of the dog before the latter moves through the space intervening between it and the periphery of the plate, then the crank-plate will continue its rotation unaffected by the dog.

It is evident that the relative sizes of the notch and dog may be so varied that the dog shall operate at any desired speed of rotation of the crank-plate. Thus, if the dog be of such size as to fit closely in the notch, the locking device will operate only when the crank-plate comes to a full stop just as the face $p$ of one of the notches P reaches the lower edge of the face of the dog, and, on the other hand, the notch may be so much wider than the dog that the device will operate when the wind-wheel is running at a high rate of speed.

In practice I have found it best to make the difference between the dog and notch so slight that the dog only drops into the notch when the crank-plate is turning very slowly. This construction avoids liability of breakage of the parts which might arise from the abrupt stopping of the mill when turning rapidly, and at the same time answers perfectly the end for which the device is intended. The crank-plate only comes in contact with the dog when the wind-wheel swings out of the wind, and whatever may be the speed of rotation of the wheel when it first comes out of the wind, it soon slows up sufficiently to permit the engagement of the dog with one of the notches in the periphery of the plate. As soon as the dog engages, the rotation of the wind-wheel shaft in either direction in its bearing is absolutely prevented; and the lock thus effected is only released by the movement of the crank-plate away from the dog in the direction indicated by the arrow $a'''$, Fig. 3—a movement which takes place whenever the wind-wheel again swings into the wind. To guard against displacement of the dog H when not in engagement with the crank-plate, it is provided with lugs N N', formed on its outer or rear face and resting against the vane-casting. These lugs act as stops to prevent the dog from swinging either inward or outward beyond a suitable working position, and the dog is thus limited to a motion sufficient to permit its engagement with or disengagement from the notches of the crank-plate.

In the drawings the notches in the crank-plate have their sides approximately radial, and each notch is of nearly the same extent at the bottom as at the top. It is evident, however, that the sides may be cut under, as shown in dotted lines at P', Fig. 4, without decreasing the efficiency or certainty of the locking device. I prefer to make the notch and dog of such forms as to lock the crank-plate against rotation in either direction; but, if desired, one side of each notch may be beveled, as shown by dotted line at P, Fig. 4, when the lock will work one way, but not the other.

I am aware that various modifications of the forms of the notch and dog shown herein may be suggested; that a spring may be substituted for the weight I'; that the notches may be cut, not in the crank-plate, but in any other attachment to the wind-wheel shaft, and, in short, that numerous equivalents for the locking device shown may be devised and applied to a windmill. I believe, however, that this is the first application to a windmill of an absolute lock adapted to operate when the mill goes out of the wind and to automatically disengage when the mill swings into the wind, and I desire, therefore, not to limit myself to the exact forms shown, but to cover all substantially equivalent means for accomplishing the same result.

In my pending application, Serial No. 132,421, already referred to, I have shown a crank-plate formed with beveled notches in its periphery and a bevel-faced spring-pawl attached to the vane-casting and adapted to engage with the notched crank-plate when the mill swings out of the wind. That device, however, is a brake adapted to decrease the speed of rotation of the crank-plate by the engagement of the pawl with a succession of notches, each of which it enters and leaves as the plate rotates. The device shown and described in this application is not in any sense a brake, however, but is a lock, having no tendency to retard the rotation of the crank-plate until it is fully in engagement, but when once in engagement stopping such rotation completely.

As I have already stated, the vane-casting

A has formed integrally with or rigidly attached to its lower arm a downwardly-projecting tube, K, which may be journaled in any suitable bearing in the mill-tower, and constitutes the main vertical pivot of the mill; and the casting B, which supports the wind-wheel shaft, is provided with a downwardly-projecting hollow boss, R, which is pivoted in the top of the tube K, and thus forms the pivotal connection of the two castings A B. The construction and connection of these parts are shown in Fig. 9, the base of the casting B and the boss R being shown in full lines, while the dotted lines show the position of the base of the casting A and the tube K, attached thereto. On the lower end of the tube K is detachably and adjustably fastened a box, L, internally cylindrical, but of varying diameter, the upper part, which receives the end of the tube K, being somewhat larger than the lower part, and the line of demarkation between the two parts being a horizontal offset or shoulder.

In the lower part of the box is journaled a cylindrical sleeve, $R'''$, provided with a horizontal flange, W, extending about one hundred and eighty degrees of the periphery of the sleeve and resting on the offset or shoulder already mentioned. A lug, $e$, Figs. 7, 8, and 10, formed on the inner surface of the box L and lying in the horizontal plane of the flange W, limits the rotation of the sleeve within the box, since the rotation of the sleeve in either direction through an angle of one hundred and eighty degrees brings one of the faces $W'$ $W''$ of the flange W against the corresponding face of the lug $e$. On the lower face of the boss R is a central hollow boss, $R'$, and on the upper face of the sleeve $R'''$ is a central hollow boss, $R''$, of the same diameter as the boss $R'$. A coiled spring, S, connects the base B of the wind-wheel casting and the sleeve $R'''$, the end coils of the spring being wound about the bosses $R'$ $R''$, respectively, and the ends $S'$ $S''$ of the spring inserted in holes $f f$, bored in the boss R and flange W, respectively.

Within the sleeve $R'''$ is journaled an outwardly-cylindrical block, T, having at its center a square opening from top to bottom, in which plays loosely the square pump-rod $B'$, already mentioned as connected with the wrist-pin E and crank-plate G by means of the pitman F.

On the lower end of the block T, below the body of the sleeve $R'''$, are two outwardly-projecting horizontal wings, $T'$ $T''$, Figs. 5, 6, and 10, similar in form and symmetrically placed, and having an angular extent of about ninety degrees each. Each of these wings has one of its faces radial and the other tangential with reference to the cylinder T, and between the radial faces $m$ $m'$ of the two wings lies a lug, V, projecting downward from the shell $R'''$, and having an angular extent considerably less than the space between said radial faces. The difference between the angular extent of the lug V and the angular extent of the space in which the lug lies is the limit of independent rotation of the block T with reference to the sleeve $R'''$. Within this limit the block may be rotated without affecting the sleeve; but when this limit is reached one of the faces $m$ $m'$ strikes the lug V, and any further rotation of the block must necessarily carry the lug V and the sleeve $R'''$ in the same direction, and since the square pump-rod $B'$ fits within the block T it is evident that by rotating the pump-rod the block may be first rotated through its limit of independent rotation, and then through a further angle, thus rotating the sleeve $R'''$ and the boss $R''$, which is a part of the sleeve. The lower end of the spring S, as I have already said, is fastened to the sleeve $R'''$ and boss $R''$, the upper end of the spring being fastened to the bosses R $R'$, which form part of the base of the wheel-supporting casting B. When the spring is free from tension, the sleeve $R'''$ and boss $R''$ assume what may be called their "natural" or "normal" position, and the box L is so arranged on the tube K that when the wind-wheel is in the wind, as in Fig. 2, and the sleeve $R'''$ is in its normal position, the lug $e$ is between the faces $W'$ $W''$ of the flange W and at such distances from said faces, respectively, as may be found necessary for the operation of the device. If the sleeve be turned from its normal position in the direction indicated by the arrow $a^{vi}$ in Figs. 5, 6, 7, 9, and 10 until the face $W''$ of the flange W strikes the lug $e$, it is evident that the spring S will be coiled tighter by such rotation, and that the resistance of the spring to the coiling operation will tend to hold the wind-wheel in the wind; and, on the other hand, if the sleeve be turned from its normal position in the direction indicated by the arrow $a^{vii}$ in said Figs. 5, 6, 7, 9, and 10 until the face $W'$ strikes the lug $e$, it is equally evident that such rotation will uncoil the spring S, and that the reaction of the spring will tend to throw the wheel out of the wind in the direction indicated by the arrow $a''$, Fig. 2. This being the case, it is only necessary to lock the sleeve $R'''$ to the box L when the sleeve has reached its limit of rotation in either direction to afford a constant force tending to throw the wind-wheel into or out of the wind, according to the position of the sleeve in the box—that is to say, if the sleeve and box be locked together when the face $W''$ of the flange W is in contact with the lug $e$, the spring S will tend constantly to hold the wind-wheel in the wind, and if the box and sleeve be locked together when the face $W'$ is in contact with the lug $e$ the force of the spring will tend constantly to hold the wind-wheel out of the wind.

The means by which the sleeve can be locked to the box in either position at will I will now describe.

In the periphery of the sleeve $R'''$ are two oppositely-formed ratchet-notches, U $U'$, each having one radial and one beveled face, and in the box L are two oppositely-set spring-pawls, $c$ $c'$, adapted to engage the notches U $U'$, respectively. The lower edge of the sleeve $R'''$ is flush with the lower edge of the box L, and also with the lower face of the pawls $c\,c'$. The lug V of the sleeve and the wings T' T''' of the block T are below the lower edge of the box L, and two lugs, $l\,l'$, project downward from the pawls $c\,c'$, respectively, and lie in the horizontal plane of the wings T' T''. A cover or cap, $t$, hollowed out to accommodate the parts T' T'' $l\,l'$ V, is bolted to the lower edge of the box L. When the spring S is in its normal position, (that is, when it is not strained in either direction, but its lower end is free,) neither of the pawls $c\,c'$ is in engagement with its corresponding notch U or U'. If the lower end of the spring and the sleeve R''', attached to it, be rotated from their normal position in the direction indicated by the arrow $a^{\mathrm{VI}}$ in Figs. 5, 6, 7, 9, and 10 until the notch U' reaches the point of the pawl $c'$, the pawl will enter the notch, as shown in Fig. 5, and since the rotation of the sleeve R''' in the direction indicated coils the spring tighter, and thus tends to hold the wind-wheel in the wind, the engagement of the pawl $c'$ and notch U' locks the sleeve and box together in such a position as to afford a constant force, pressing the wind-wheel casting away from the lug O of the vane-casting and toward the lug O' thereof. The rotation of the sleeve R''' is accomplished by turning the pump-rod B' and the block T, and when the pawl $c'$ drops into the notch U' the block T and its wings T' T'' are in the position shown in Fig. 5, the wing T'' being between the lug V of the sleeve R''' and the lug $l'$ of the pawl $c'$, and the face $m'$ of the wing being in contact with the lug V. To disengage the pawl $c'$ from the notch U', and thus disconnect the sleeve R''' from the box L, it is only necessary to turn the pump-rod and the block T in the direction indicated by the arrow $a^{\mathrm{VII}}$, Figs. 5 and 6. The block T has a certain limited rotation independent of the sleeve R''', and this independent rotation is sufficient to allow the beveled face $m'''$ of the wing T'' to strike the lug $l'$ and force the pawl $c'$ out of its notch before the face $m$ of the wing T' strikes the lug V. When the face $m$ reaches the lug V, the parts are in the positions shown in Fig. 6, the pawl $c'$ being wholly disengaged from the notch U', and secured against engagement therewith by the wing T''. From the position shown in Fig. 6, the sleeve R''' and block T, if left to themselves, will continue to rotate in the direction indicated by the arrow $a^{\mathrm{VII}}$ until the spring S is relieved of tension, or, as I have already expressed it, until the spring and the sleeve R''' reach their normal position. The sleeve R''' being thus disengaged from the box L, (or, in other words, from the vane-casting A,) the spring S has no tendency whatever to hold the wind-wheel casting against either of the lugs O O'. If it be desired to so connect the sleeve R''' and box L that the spring S shall hold the wind-wheel out of the wind, the sleeve R''' is turned by means of the pump-rod and block T in the direction indicated by the arrow $a^{\mathrm{VII}}$ until the pawl $c$ enters the notch U. This rotation of the sleeve uncoils the spring, and the resistance of the spring turns the wind-wheel casting in the direction indicated by the arrow $a''$, Fig. 2. When the pawl $c$ and notch U are in engagement, they may be disengaged by the reversal of the operation already explained for disengaging the pawl $c'$ and notch U'—that is, by turning the pump-rod B' and block T in the direction indicated by the arrow $a^{\mathrm{VI}}$ until the beveled face $m''$ of the wing T' forces the pawl out of its notch. As soon as the pawl $c$ is so disengaged the sleeve R''' is free from the box L, and will rotate to its normal position if left free.

The various parts within the box L are so placed with relation to each other that the face W'' of the flange W strikes the lug $e$ at the instant the notch U' is entered by the pawl $c'$, and the face W' of the flange strikes the lug $e$ at the instant the pawl $c$ enters the notch U. The lug $e$ thus forms not only a positive limit to the independent rotation of the sleeve R''' within the box, but also insures the engagement of each of the pawls $c\,c'$ with the proper notch U U', by preventing any further rotation of the sleeve beyond the point where the pawl and notch can engage.

From the foregoing description and explanation of the mechanism shown in the drawings it appears that by turning the pump-rod in one direction I develop a force which tends to hold the wind-wheel in the wind; that the force so developed is connected with the vane-casting and wind-wheel casting by a lock whose engagement is permanent as against any accidental displacement; that the reverse rotation of the pump-rod, however, disengages said lock, leaving the vane-casting and wind-wheel casting free to rotate with reference to each other, and that the further rotation of the rod in the direction last named develops a force tending to hold the wind-wheel out of the wind, and the force thus developed is locked to the two main castings by means secure against accidental disconnection. The mill is thus turned out of the wind, not by overcoming the force which tends to hold it in the wind, but by first disconnecting that force, and this feature is, so far as I know, absolutely novel. I do not intend, therefore, to limit my invention in this regard to the employment of the parts shown and described; but I desire to cover the disconnection of the regulating force from either the vane-casting or the wind-wheel casting, or from both at once.

It is evident that the base of the vane-casting may be pivoted in the base of the wind-wheel casting and the upper end of the spring connected with the vane-casting, leaving the lower or free end to be connected with the tubular extension of the wind-wheel casting; but such reversal of these parts would not affect the principle or operation of the mechanism, and in the claims I shall treat these two constructions as evident equivalents one of the other.

In the drawings I have shown a regulating-vane; but a vaneless mill may be substituted, in which case the wind-wheel shaft will still be normally parallel or approximately parallel to the line of direction of the wind. As the construction suggested is one very well known in windmills, no illustration thereof is thought necessary.

Having now described my invention and explained its operation, what I claim as new, and desire to secure by Letters Patent, is—

1. In a windmill, the combination of a vane and a wind-wheel-supporting casting, each pivoted on a vertical axis, a wind-wheel shaft journaled in said casting and normally parallel or approximately parallel to the vane, a stop or stops adapted to prevent the rotation of said casting from its normal position in one direction, but to permit such rotation in the opposite direction, a coiled spring connected at one end with one of said pivoted parts and having its free end in position to be connected with the other of said parts, means whereby the free end of said spring may be rotated in either direction and said spring thus coiled closer or uncoiled at will, and means whereby said free end, after such rotation in either direction, may be connected with said last-mentioned pivoted part, and said spring be thus made to assist or resist the rotation of the wind-wheel casting from its normal position in the direction permitted by said stop or stops.

2. In a windmill, the combination of a vane and a wind-wheel casting, each pivoted on a vertical axis, a wind-wheel shaft journaled in said casting and normally parallel or approximately parallel to the vane, suitable coacting stops attached to said vane and said wind-wheel casting, respectively, and adapted to permit the rotation of said wind-wheel casting from its normal position in one direction, but to prevent such rotation in the opposite direction, a coiled spring connected at one end with said wind-wheel casting and having its free end in position to be connected with said vane, means for rotating the free end of the spring in either direction, and thereby coiling or uncoiling the spring, and means whereby said spring, when coiled or uncoiled by such rotation of its free end, may be connected with said vane, and thus exert a force to resist or assist, as desired, the rotation of the wind-wheel casting from its normal position in the direction permitted by said stop or stops.

3. In a windmill, the combination of a vane-casting and a wind-wheel-supporting casting, each pivoted on a vertical axis, a coiled spring connected at one end with one of said pivoted castings, a pawl-and-ratchet mechanism, one of whose coacting parts is attached to the free end of said spring and the other part to the other of said pivoted castings, means for rotating the free end of said spring with reference to said pivoted castings, and means whereby, after such rotation, the parts of said pawl-and-ratchet mechanism may be brought into engagement and said spring be made to exert upon each of said pivoted castings a force tending to rotate it with reference to the other.

4. In a windmill, the combination of the vane-casting and the wind-wheel-supporting casting, each pivoted on a vertical axis, a coiled spring connected at one end with the wind-wheel-supporting casting and having its free end in position to be connected with the vane-casting, two oppositely-placed pawl-and-ratchet mechanisms, each adapted to connect the free end of said spring with said vane-casting, and means whereby the free end of the spring may be rotated in either direction, its rotation in one direction bringing one of said pawl-and-ratchet mechanisms into engagement and its rotation in the opposite direction bringing the other pawl-and-ratchet mechanism into engagement.

5. In a windmill, the combination of a vane-casting and a wind-wheel-supporting casting, each pivoted on a vertical axis, a coiled spring connected at one end with one of said pivoted castings, a pump-rod lying within said coiled spring and connected with the free end thereof by means whereby the rotation of the pump-rod rotates the free end of said spring, and means whereby the free end of said spring, when rotated by the rotation of the pump-rod into a given position with relation to said castings, shall be connected with the other of said pivoted castings, and said spring be thereby made to exert on each of said castings a force tending to rotate it with reference to the other.

6. In a windmill, the combination of a vane-casting and a wind-wheel-supporting casting, one of said castings having a vertical tubular base pivoted in the tower of the mill and the other a tubular base pivoted within the base of the first, a coiled spring attached at one end to the inner of said bases and having its axis coincident with the axis of said base, a pump-rod passing through said spring and said pivoted bases, and connected with the free end of the spring by means whereby the rotation of the pump-rod in either direction rotates the free end of the spring, two oppositely-placed pawl-and-ratchet mechanisms, each adapted to connect the free end of the spring with said outer tubular base, and means whereby the rotation of the free end of the spring in one direction through a given angular space shall bring one of said pawl-and-ratchet mechanisms into engagement and a like rotation of said free end in the opposite direction shall bring the other pawl-and-ratchet mechanism into engagement.

7. In a windmill, the combination of a vane-casting and a wind-wheel-supporting casting, the base of one of said castings being pivoted in the windmill-tower and the base of the other being pivoted in the base of the first, a pump-rod passing through both of said bases and susceptible of rotation independent of both of them, a coiled spring surrounding said pump-rod and connected at one end with the inner of said pivoted bases, two oppositely-placed pawls attached to the outer of said bases, a notched sleeve or block attached to the free end of said spring and adapted to engage with one of said pawls when the free end of said spring is rotated through a given angular space in one direction from its normal position, and to engage with the other of said pawls when said free end is similarly rotated in the opposite direction, and means connecting said pump-rod with said notched sleeve, whereby the rotation of the pump-rod in either direction rotates said sleeve and the free end of said spring.

8. In a windmill, the combination of a vane-casting and a wind-wheel-supporting casting, the base of one of said castings being pivoted in a stationary vertical bearing and the base of the other being pivoted in the base of the first, a coiled spring connected at one end with the inner of said pivoted bases, and a notched sleeve attached to the free end of said spring, a pawl attached to the outer of said pivoted bases and adapted to engage with said notched sleeve when the free end of said spring is rotated through a given angular space from its normal position, a block journaled in said sleeve and having a limited rotation independent thereof, but adapted, when rotated beyond said limit, to rotate said sleeve, a pump-rod passing through said block, sleeve, spring, and pivoted bases, and adapted when rotated to rotate said block, and a wing or projection on said block adapted to disengage said pawl from the notch in said sleeve, whereby the rotation of said rod in one direction brings said pawl and notch into engagement and the reverse rotation thereof disengages said pawl and notch and disconnects the spring from said outer base.

9. The combination of the vane-casting having the vertical tubular base K L, pivoted in a suitable stationary bearing, the wind-wheel-supporting casting having the tubular base R, pivoted within the tubular base K, the spring S, lying within the tubular base K L and fastened at its upper end to the base R, the notched sleeve R''', fastened to the lower end of the spring S and susceptible of rotation within the base K L, the pawl c', attached to the base K L and adapted to engage with the notch U' of the sleeve R''' when the sleeve is rotated from its normal position through a given angular space in the direction requisite to coil the spring S closer, the pump-rod B', lying within said sleeve and spring, and means connecting said pump-rod with said sleeve and adapted to communicate rotary motion of the pump-rod to the sleeve.

10. The combination of the box L, the pawls c c', pivoted to the box, the sleeve R''', journaled in the box and having notches U U', adapted to engage the pawls c c', respectively, the block T, journaled in the sleeve R''' and having limited independent rotation therein, and the pump-rod B', passing through the block and adapted to rotate the same, substantially as shown and described, and for the purpose set forth.

11. The combination of the box L, provided with lug e, the sleeve R''', journaled in the box and provided with the flange W, adapted to co-operate with the lug e and limit the rotation of the sleeve in the box, the block T, journaled in the sleeve and having wings T' T'', adapted to co-operate with a lug, V, on the sleeve, and thus limit the rotation of the block in the sleeve, and the oppositely-placed pawls c c', attached to the box L and adapted to engage, respectively, with corresponding notches, U U', in the sleeve R'''.

12. The combination, with the box L, having the lug e, of the sleeve R''', journaled in said box and provided with the lug V, the notches U U', and the flange W, adapted to co-operate with the lug e and limit the rotation of the sleeve in the box, the pawls c c', pivoted to the box L and adapted to engage with the notches U U', respectively, the block T, journaled in the sleeve R''' and provided with the wings T' T'', and the pump-rod B, passing through the block T and adapted to rotate the same, each of the wings T' T'' having one face adapted to strike the lug V and limit the rotation of the block in the sleeve, and having another face adapted to disengage one of the pawls c c' from the corresponding notch in the sleeve R'''.

13. The combination, in a windmill, of a vane-casting and a wind-wheel-supporting casting, each pivoted on a vertical axis, a wind-wheel shaft journaled in said wheel-supporting casting, a notched plate or its equivalent mounted on the wind-wheel shaft, and a latch attached to the vane-casting and adapted to engage the notches of the plate when the wind-wheel swings out of the wind and to lock said plate and the wind-wheel shaft against rotation when in such engagement.

14. The combination, with the two main castings of a mill, each swinging about a vertical axis, of a wind-wheel shaft journaled in one of said castings and a vane attached to the other, a notched plate attached to and rotating with the wind-wheel shaft, and having a series of notches in its periphery, and a latch pivoted to the vane-casting and adapted to engage the notches in said plate when the wind-wheel swings out of the wind, the contact of each of said notches with said latch being approximately radial with reference to the axis of rotation of the plate, whereby the engagement of the latch and plate locks the shaft against rotation, substantially as and for the purpose set forth.

15. The combination of the wind-wheel shaft, the crank-plate G, mounted thereon and having in its periphery the notches P, formed substantially as set forth, and the latch H, pivoted to the vane-casting of the mill and adapted to engage the notches P as the wind-wheel swings out of the wind, substantially as shown and described, and for the purpose set forth.

16. The combination of the wind-wheel shaft, the crank-plate G, notched substantially as described, and the latch H, pivoted to the vane-casting of the mill and provided with the weighted arm I I', said latch being adapted to engage the notches of the plate G when the wind-wheel swings out of the wind and to lock the plate and the shaft against rotation when in engagement.

In testimony whereof I have signed this specification in the presence of two subscribing witnesses.

DANIEL C. STOVER.

Witnesses:
J. A. CRAIN,
L. M. CURRIER.